(12) United States Patent
Chen et al.

(10) Patent No.: US 11,978,874 B2
(45) Date of Patent: May 7, 2024

(54) ELECTRONIC DEVICE LOW-TEMPERATURE PROTECTION METHOD AND ELECTRONIC DEVICE

(71) Applicant: HUAWEI TECHNOLOGIES CO., LTD., Shenzhen (CN)

(72) Inventors: Bowen Chen, Shanghai (CN); Siyang Li, Shanghai (CN); Zhe Xing, Shanghai (CN); Jie Yang, Dongguan (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 589 days.

(21) Appl. No.: 17/277,855

(22) PCT Filed: Sep. 21, 2018

(86) PCT No.: PCT/CN2018/107059
§ 371 (c)(1),
(2) Date: Mar. 19, 2021

(87) PCT Pub. No.: WO2020/056747
PCT Pub. Date: Mar. 26, 2020

(65) Prior Publication Data
US 2021/0351451 A1 Nov. 11, 2021

(51) Int. Cl.
*H04W 52/02* (2009.01)
*G06F 1/3218* (2019.01)
(Continued)

(52) U.S. Cl.
CPC ........ *H01M 10/635* (2015.04); *G06F 1/3218* (2013.01); *H01M 10/623* (2015.04); *H01M 10/0525* (2013.01)

(58) Field of Classification Search
CPC ............ H01M 10/635; H01M 10/623; H01M 10/0525; G06F 1/3218
See application file for complete search history.

(56) References Cited

U.S. PATENT DOCUMENTS

2005/0274705 A1* 12/2005 Zhu ..................... H01M 10/633
219/202
2010/0070746 A1* 3/2010 Chiu ........................ G06F 1/20
713/2
(Continued)

FOREIGN PATENT DOCUMENTS

CN 1701986 A 11/2005
CN 201616494 U 10/2010
(Continued)

*Primary Examiner* — Moustapha Diaby
(74) *Attorney, Agent, or Firm* — Rimon PC

(57) ABSTRACT

An electronic device low-temperature protection method includes: obtaining, by an electronic device, an environmental temperature and a temperature of a battery of the electronic device; determining, by the electronic device based on the environmental temperature and the temperature of the battery, that the electronic device is in a low-temperature environment; and implementing, by the electronic device, low-temperature protection in response to the determined being in the low-temperature environment. According to the electronic device low-temperature protection method provided in this application, both the environmental temperature and the temperature of the battery are considered, and whether the electronic device is in a low-temperature state is detected based on the environmental temperature and the temperature of the battery.

20 Claims, 3 Drawing Sheets

---

An electronic device obtains an environmental temperature and a temperature of a battery of the electronic device — S201

The electronic device determines, based on the environmental temperature and the temperature of the battery, that the electronic device is in a low-temperature environment — S202

The electronic device implements low-temperature protection in response to the determined being in the low-temperature environment — S203

(51) Int. Cl.
*H01M 10/623* (2014.01)
*H01M 10/635* (2014.01)
*H01M 10/0525* (2010.01)

(56) References Cited

U.S. PATENT DOCUMENTS

| | | | | |
|---|---|---|---|---|
| 2013/0013937 | A1* | 1/2013 | Koshimizu | H05K 1/0201 |
| | | | | 713/300 |
| 2014/0356658 | A1* | 12/2014 | Rogers | H01M 10/615 |
| | | | | 219/494 |
| 2016/0066266 | A1* | 3/2016 | Law | G06F 1/3206 |
| | | | | 455/574 |

FOREIGN PATENT DOCUMENTS

| | | | |
|---|---|---|---|
| CN | 101930057 | A | 12/2010 |
| CN | 101976743 | A | 2/2011 |
| CN | 102055042 | A | 5/2011 |
| CN | 102544609 | A | 7/2012 |
| CN | 103415957 | A | 11/2013 |
| CN | 103956710 | A | 7/2014 |
| CN | 104051800 | A | 9/2014 |
| CN | 104300606 | A | 1/2015 |
| CN | 105742758 | A | 7/2016 |
| CN | 105789719 | A | 7/2016 |
| CN | 105808409 | A | 7/2016 |
| CN | 105900260 | A | 8/2016 |
| CN | 205610257 | U | 9/2016 |
| CN | 106025441 | A | 10/2016 |
| CN | 106030965 | A | 10/2016 |
| CN | 106208230 | A | 12/2016 |
| CN | 106654463 | A | 5/2017 |
| CN | 106711523 | A | 5/2017 |
| CN | 106848486 | A | 6/2017 |
| CN | 107275688 | A | 10/2017 |
| CN | 107331923 | A | 11/2017 |
| CN | 107394308 | A | 11/2017 |
| CN | 107863589 | A | 3/2018 |
| CN | 107914584 | A | 4/2018 |
| CN | 207565376 | U | 7/2018 |
| EP | 3376017 | A1 | 9/2018 |
| IN | 105633498 | A | 6/2016 |
| JP | 3391577 | B2 | 3/2003 |
| JP | 2005340211 | A | 12/2005 |
| JP | 3768285 | B2 | 4/2006 |
| JP | 2011207321 | A | 10/2011 |
| JP | 2013037672 | A | 2/2013 |
| JP | 2013109752 | A | 6/2013 |
| JP | 2015191777 | A | 11/2015 |
| JP | 2015534038 | A | 11/2015 |
| JP | 2017076544 | A | 4/2017 |
| WO | 2008023245 | A2 | 2/2008 |
| WO | 2014005235 | A1 | 1/2014 |
| WO | 2018129977 | A1 | 7/2018 |

* cited by examiner

ELECTRONIC DEVICE LOW-TEMPERATURE PROTECTION METHOD AND ELECTRONIC DEVICE

CROSS-REFERENCE TO RELATED APPLICATIONS

This application is a National Stage of International Application No. PCT/CN2018/107059, filed on Sep. 21, 2018, which is hereby incorporated by reference in its entirety.

TECHNICAL FIELD

This application relates to the field of battery technology, and in particular, to an electronic device low-temperature protection method and related electronic device.

BACKGROUND

With advantages such as high nominal voltage, large specific energy, high charging/discharging efficiency, and a long service life, lithium batteries are widely used as the battery energy storage of electronic devices such as an electric vehicle, a notebook computer, and a mobile phone. Lithium batteries having the same performance can be connected in series to achieve advantages such as improved use voltage and reduced charging current. Therefore, a battery string formed by a plurality of lithium batteries connected in series is widely used.

In a high-temperature environment, the capacity of a battery string decreases, and there may a danger of explosion caused by high temperature. In a low-temperature environment, the performance of a battery string also decreases, and the normal operation of an electronic device such as a mobile phone or a tablet computer is affected. Therefore, monitoring the temperature of a battery string in real time is practical. Currently, to monitor the temperature of the battery string in real time, one temperature sensor is usually disposed on each battery in the battery string, and is configured to detect a temperature of the battery. When the detected temperature of the battery is not within a preset temperature range, the temperature sensor sends alarm information.

However, the temperature of a battery cell is usually lower than the temperature of the battery monitored by the temperature sensor. When the temperature sensor determines, based on the monitored temperature of the battery, that the battery string operates in the low-temperature environment, the temperature of the battery cell is already significantly lower than the lowest temperature acceptable to the battery string. There is a delay in low temperature detection through the temperature sensor. In addition, disposing the temperature sensor on each battery in a battery string results in a complex structure and comparatively high costs.

SUMMARY

This application provides an electronic device low-temperature protection method and related electronic device, to resolve the problems of temperature detection delay, complex structure, and comparatively high costs caused by disposing a temperature sensor on each battery currently used in electronic device low-temperature protection.

A first aspect of this application provides an electronic device low-temperature protection method, including: obtaining, by an electronic device, an environmental temperature and a temperature of a battery of the electronic device; determining, by the electronic device based on the environmental temperature and the temperature of the battery, that the electronic device is in a low-temperature environment; and implementing, by the electronic device, low-temperature protection in response to the determination of being in the low-temperature environment.

Whether the electronic device is in the low-temperature environment is detected based on both the environmental temperature and the temperature of the battery, to avoid a delay in electronic device low-temperature detection performed based on only the temperature of the battery, and improve the accuracy of the electronic device low-temperature environment detection.

For example, for determining, based on the environmental temperature and the temperature of the battery, whether the electronic device is in the low-temperature environment, this application provides the following several feasible implementations.

In a feasible implementation, when the environmental temperature is lower than a first preset temperature, determining, by the electronic device based on that the temperature of the battery is lower than a second preset temperature, that the electronic device is in the low-temperature environment.

In a feasible implementation, when the temperature of the battery is lower than a first preset temperature, determining, by the electronic device based on that the environmental temperature is lower than a second preset temperature, that the electronic device is in the low-temperature environment.

In a feasible implementation, when the environmental temperature is lower than a first preset temperature, determining, by the electronic device based on that the temperature of the battery is lower than a second preset temperature and/or the environmental temperature is lower than a third preset temperature, that the electronic device is in the low-temperature environment.

In a feasible implementation, when the temperature of the battery is lower than a first preset temperature, determining, by the electronic device based on that the environmental temperature is lower than a second preset temperature and/or the temperature of the battery is lower than a third preset temperature, that the electronic device is in the low-temperature environment.

It may be understood that values of the first preset temperature in the foregoing implementations may be the same or may be different. Likewise, values of the second preset temperature in the foregoing implementations may be the same or may be different. Values of the third preset temperature in the foregoing implementations may be the same or may be different.

In the several electronic device low-temperature environment detection manners, the electronic device low-temperature environment detection has two objectives: to improve the efficiency and accuracy of the electronic device low-temperature environment detection, and avoid the impact of battery performance deterioration when a user uses the electronic device in the low-temperature environment. Whether the electronic device is in the low-temperature environment is detected based on the environmental temperature and the temperature of the battery in another low-temperature environment detection process, to improve detection efficiency while also improving the accuracy of the electronic device low-temperature environment detection and enhancing an electronic device low-temperature protection effect.

A process of obtaining the environmental temperature in the foregoing possible implementations may include: obtaining a system parameter of the electronic device, searching for a preset mapping relationship based on the system parameter, and determining, in the preset mapping relationship, an environmental temperature corresponding to the system parameter. The preset mapping relationship indicates the environmental temperature corresponding to the system parameter.

It may be understood that the system parameter of the electronic device includes at least one of the following: a power of the display of the electronic device, a luminance of the display of the electronic device, a power consumption of the electronic device, and/or a temperature collected by a temperature sensor of the battery.

The temperature of the battery in the foregoing possible implementations may be a temperature collected by a temperature sensor of the electronic device.

When the electronic device determines that the electronic device is in the low-temperature environment, to avoid the adverse impact when the user uses the electronic device, the electronic device should be prevented from having comparatively high power consumption and running a high-power functional component, such as a flashlight function and a photo-flash light function. For example, the performing of the electronic device low-temperature protection includes at least one of the following manners: adjusting an operating voltage/current of at least one component of the electronic device; or disabling at least one function/application program running in the electronic device.

A second aspect of this application provides an electronic device low-temperature protection apparatus, configured to perform the electronic device low-temperature protection method in any implementation of the first aspect. The low-temperature protection apparatus has a same or similar technical means and technical effect. Details are not described again in this application.

The electronic device low-temperature protection apparatus provided in this application includes functional units configured to implement any implementation in the first aspect. For example, the electronic device low-temperature protection apparatus includes: a temperature obtaining module, configured to obtain an environmental temperature and a temperature of a battery of an electronic device; a low-temperature environment detection module, configured to determine, based on the environmental temperature and the temperature of the battery, that the electronic device is in a low-temperature environment; and a low-temperature protection module, configured to perform low-temperature protection in response to the determination of being in the low-temperature environment.

Optionally, the low-temperature environment detection module performs low-temperature environment detection in two steps. In a possible implementation, the low-temperature environment detection module first determines that the environmental temperature is lower than a first preset temperature, and then determines, based on that the temperature of the battery is lower than a second preset temperature, that the electronic device is in the low-temperature environment.

In a possible implementation, the low-temperature environment detection module first determines that the temperature of the battery is lower than a first preset temperature, and then determines, based on that the environmental temperature is lower than a second preset temperature, that the electronic device is in the low-temperature environment.

In a possible implementation, the low-temperature environment detection module first determines that the environmental temperature is lower than a first preset temperature, and then determines, based on that the temperature of the battery is lower than a second preset temperature and/or the environmental temperature is lower than a third preset temperature, that the electronic device is in the low-temperature environment.

In a possible implementation, the low-temperature environment detection module first determines that the temperature of the battery is lower than a first preset temperature, and then determines, based on that the environmental temperature is lower than a second preset temperature and/or the temperature of the battery is lower than a third preset temperature, that the electronic device is in the low-temperature environment.

It may be understood that values of the first preset temperature in the foregoing implementations may be the same or may be different. Likewise, values of the second preset temperature in the foregoing implementations may be the same or may be different. Values of the third preset temperature in the foregoing implementations may be the same or may be different.

For example, the temperature obtaining module is specifically configured to search for a preset mapping relationship based on a system parameter of the electronic device, for example, power of a display of the electronic device, luminance of the display of the electronic device, power consumption of the electronic device, and/or a temperature collected by a temperature sensor of the battery, to determine an environmental temperature corresponding to the system parameter.

For example, the temperature obtaining module further receives a temperature collected by a temperature sensor of the electronic device.

When the electronic device is in the low-temperature environment, the low-temperature protection module may perform the electronic device low-temperature protection in at least one of the following manners: adjusting an operating voltage/current of at least one component of the electronic device; or disabling at least one function/application program running on the electronic device.

A third aspect of this application provides an electronic device low-temperature protection device, configured to perform the electronic device low-temperature protection method in any implementation of the first aspect. The low-temperature protection device has a same or similar technical means and technical effect. Details are not described again in this application.

A fourth aspect of this application provides an electronic device, configured to perform the electronic device low-temperature protection method in any implementation of the first aspect. The electronic device has a same or similar technical means and technical effect. Details are not described again in this application.

The electronic device provided in this application includes a temperature sensor, a memory, a processor, and a battery. The temperature sensor is configured to monitor a temperature of the battery and send the temperature of the battery to the processor.

The processor is configured to: obtain an environmental temperature and the temperature of the battery of the electronic device; determine that the electronic device is in a low-temperature environment based on the environmental temperature and the temperature of the battery; and implement low-temperature protection in response to the determined being in the low-temperature environment.

In a possible implementation, the processor is specifically configured to: when the environmental temperature is lower than a first preset temperature, determine, based on that the temperature of the battery is lower than a second preset temperature, that the electronic device is in the low-temperature environment.

In a possible implementation, the processor is specifically configured to: when the temperature of the battery is lower than a first preset temperature, determine, based on that the environmental temperature is lower than a second preset temperature, that the electronic device is in the low-temperature environment.

In a possible implementation, the processor is specifically configured to: when the environmental temperature is lower than a first preset temperature, determines, based on that the temperature of the battery is lower than a second preset temperature and/or the environmental temperature is lower than a third preset temperature, that the electronic device is in the low-temperature environment.

In a possible implementation, the processor is configured to: when the temperature of the battery is lower than a first preset temperature, determines, based on that the environmental temperature is lower than a second preset temperature and/or the temperature of the battery is lower than a third preset temperature, that the electronic device is in the low-temperature environment.

It may be understood that values of the first preset temperature in the foregoing implementations may be the same or may be different. Likewise, values of the second preset temperature in the foregoing implementations may be the same or may be different. Values of the third preset temperature in the foregoing implementations may be the same or may be different.

Optionally, the processor is configured to search for a preset mapping relationship based on a system parameter of the electronic device, such as power of a display of the electronic device, luminance of the display of the electronic device, power consumption of the electronic device, and/or a temperature collected by a temperature sensor of the battery, to determine an environmental temperature corresponding to the system parameter.

Optionally, the processor is configured to obtain the temperature collected by the temperature sensor and use the temperature as the temperature of the battery.

When the battery is in a low-temperature state, the processor may perform electronic device low-temperature protection by adjusting an operating voltage/current of at least one component of the electronic device; or disabling at least one operating function/application program in the electronic device.

A fifth aspect of this application provides a computer storage medium. The storage medium includes a computer program. The computer program is used to implement the electronic device low-temperature protection method according to any one of the possible implementations of the first aspect.

A sixth aspect of this application provides a computer program product. The computer program product includes computer program code. When the computer program code is run on a computer, the computer is enabled to perform the electronic device low-temperature protection method in any possible implementation of the first aspect.

A seventh aspect of this application provides a chip, including a memory and a processor. The memory is configured to store a computer program. The processor is configured to invoke the computer program from the memory and run the computer program, so that an electronic device in which the chip is installed performs the electronic device low-temperature protection method in any possible implementation of the first aspect.

In this application, based on the implementations provided in the foregoing aspects, the implementations may be further combined to provide more implementations.

DESCRIPTION OF EMBODIMENTS

The following describes the technical solutions in embodiments of this application with reference to the accompanying drawings in the embodiments of this application.

Figure 1:
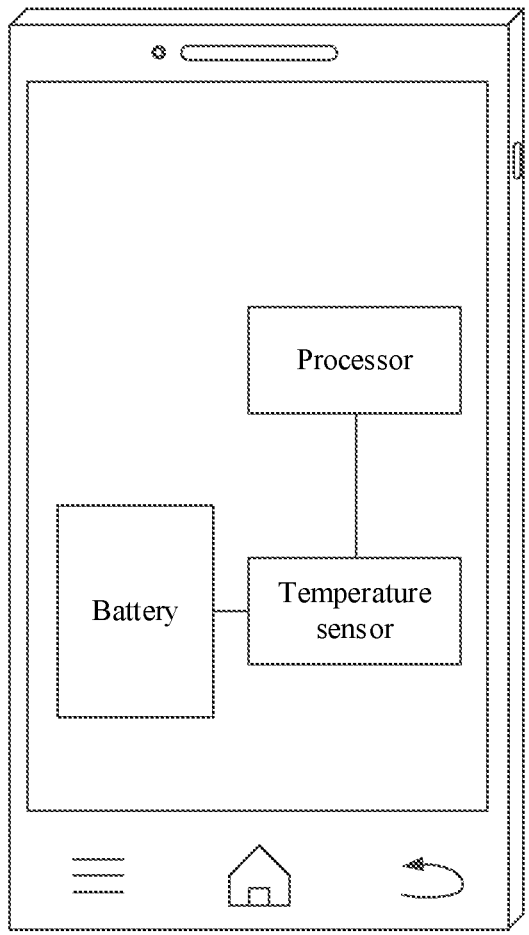
FIG. 1 is a schematic diagram of a structure of an electronic device according to an embodiment of this application.

FIG. 1 is a schematic diagram of a structure of an electronic device according to an embodiment of this application. As shown in FIG. 1, the electronic device includes at least a battery, a temperature sensor, and a processor.

For example, the electronic device may be a portable device such as a notebook computer, a mobile phone, or a smart band, or may be a device such as an electric vehicle, an electric motor vehicle, or a drone. This is not limited in this application. In FIG. 1, the structure of the electronic device is described using a mobile phone as an example.

For example, the battery is configured to supply power to the electronic device, so that the electronic device implements a corresponding function based on a user operation, or executes a corresponding program. The battery in the embodiments of this application may be a battery string including lithium batteries connected in series, or may be an independent lithium battery.

The temperature sensor is usually disposed on a protection board of the battery, and is configured to monitor a temperature of the battery. The temperature sensor may send a monitored temperature of the battery to the processor, so that the processor performs electronic device low-temperature protection based on the temperature of the battery. Optionally, the temperature sensor may be a negative temperature coefficient (NTC) temperature sensor.

For example, the electronic device provided in the embodiments of this application detects, based on both the temperature of the battery provided by the temperature sensor and an environmental temperature of the electronic device, whether the electronic device is in a low-temperature environment. The electronic device can detect that the electronic device is in a low-temperature environment in a timely manner. This avoids a delay in conventional electronic device low-temperature protection in which electronic device low-temperature protection is performed based on only a temperature of the battery detected by a temperature sensor, and solves the problems of a complex structure and comparatively high costs caused by the need of using a plurality of temperature sensors in an electronic device. Therefore, the electronic device low-temperature protection method provided in this application has a comparatively good low-temperature protection effect.

The following uses specific embodiments to describe in detail a process of implementing electronic device low-temperature protection. The following embodiments of this application provide at least an electronic device low-temperature protection method and an electronic device. In the following several specific embodiments, same or similar concepts or processes may not be described in detail in some embodiments.

Figure 2:
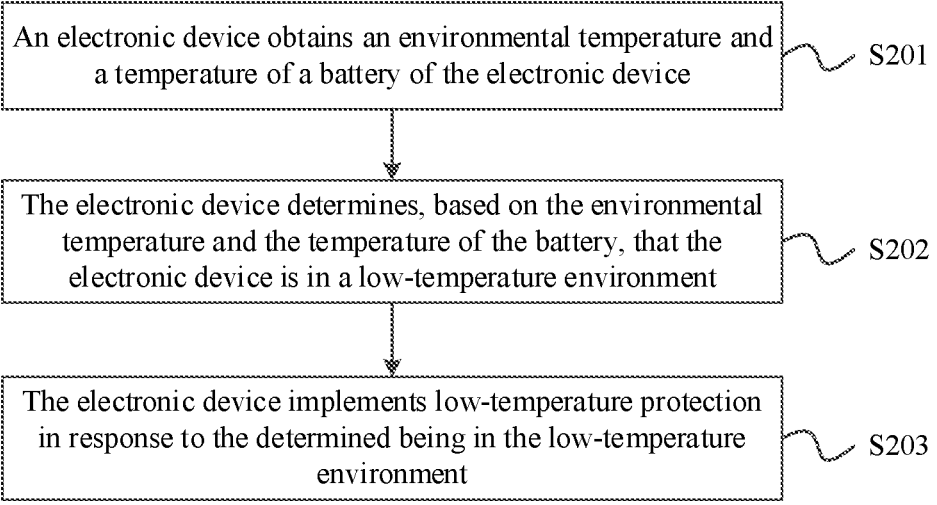
FIG. 2 is a schematic flowchart of an electronic device low-temperature protection method according to an embodiment of this application.

An aspect of the embodiments of this application provides an electronic device low-temperature protection method. FIG. 2 is a schematic flowchart of an electronic device low-temperature protection method according to an embodiment of this application. According to the electronic device low-temperature protection method provided in this embodiment of this application, whether an electronic device is in a low-temperature environment is determined based on a temperature of a battery provided by a temperature sensor and an environmental temperature of the electronic device, and low-temperature protection is performed on the electronic device when the electronic device is in the low-temperature environment. Therefore, the electronic device low-temperature protection provided in this application is timelier. The electronic device low-temperature protection method provided in this embodiment may be executed by the electronic device in FIG. 1. As shown in FIG. 2, the electronic device low-temperature protection method includes the following steps.

S201: The electronic device obtains the environmental temperature and the temperature of the battery of the electronic device.

For example, the electronic device obtains the environmental temperature and the temperature of the battery in real time or in a preset period.

The temperature of the battery is a temperature of a battery measured by a temperature measurement device in real time or in a preset period. Optionally, a manner in which the electronic device obtains the temperature of the battery may be obtaining a temperature collected by the temperature sensor of the electronic device. Optionally, the temperature of the battery may alternatively be a temperature obtained by another temperature measurement apparatus by directly measuring or detecting the battery. This is not limited in this application. It may be understood that the electronic device may directly receive the temperature collected by the temperature sensor, or may receive a data collected by the temperature sensor, and then obtain a temperature corresponding to the data.

For example, the temperature of the battery may be obtained by the temperature sensor disposed on a protection board of the battery, and is higher than a temperature of a battery cell. When the temperature protection is performed on the electronic device based on the temperature of the battery, whether the battery of the electronic device is in a high-temperature environment can be detected in a timely manner, but whether the battery of the electronic device is in the low-temperature environment cannot be detected in a timely manner. Therefore, there is a delay in the electronic device low-temperature protection. In other words, when the electronic device determines, based on the temperature of the battery, that the electronic device is in the low-temperature environment, the battery cell is already in the low-temperature environment.

In this embodiment, when the temperature of the battery is obtained, the environmental temperature of the electronic device is also obtained. The environmental temperature of the electronic device may be a temperature of the environment in which the electronic device is located. Because the battery generates heat or the like when being used, the environmental temperature of the electronic device is usually lower than the temperature of the battery cell. Therefore, when the temperature protection is performed on the electronic device based on the environmental temperature of the electronic device, whether the electronic device is in the low-temperature environment can be detected in a timely manner.

Optionally, a possible manner of obtaining the environmental temperature may be:

the electronic device determines the environmental temperature based on a system parameter of the electronic device and a preset mapping relationship, where the preset mapping relationship indicates an environmental temperature corresponding to the system parameter.

For example, the electronic device stores the preset mapping relationship. The preset mapping relationship indicates the environmental temperature of the electronic device when the system parameter of the electronic device is a combination of different values. The preset mapping relationship may be obtained through test statistics before the electronic device is delivered from a factory, and is configured in the electronic device when the electronic device is delivered from the factory. When the electronic device is a communicable device, the electronic device may further update the preset mapping relationship through a network.

When the electronic device stores the preset mapping relationship, the preset mapping relationship may be searched for based on the obtained system parameter of the electronic device, to determine the environmental temperature of the electronic device.

Optionally, in the manner of obtaining the environmental temperature, the system parameter of the electronic device includes at least one of the following:

power of a display of the electronic device, luminance of the display of the electronic device, power consumption of the electronic device, and/or the temperature collected by the temperature sensor of the battery.

For example, the system parameter of the electronic device further includes information such as a running state of an application in the electronic device, usage of a processor and a memory of the electronic device, and whether the electronic device is provided with a housing and a housing material.

Optionally, another possible manner of obtaining the environmental temperature may be obtaining temperature information of a geographical position of the electronic device as the environmental temperature.

For example, when the electronic device is a networkable device such as a mobile phone or a tablet computer, current temperature information of the geographical position of the electronic device may be queried through the network, and is used as the environmental temperature. Temperature information provided by an existing weather application in the electronic device may alternatively be used as the environmental temperature.

Optionally, yet another possible manner of obtaining the environmental temperature may be obtaining a room temperature provided by an air conditioner in a room in which the electronic device is located, and using the room temperature as the environmental temperature.

For example, the electronic device manages smart household appliances such as the air conditioner, a smart sweeper, a refrigerator, and a monitor in the room.

S202: The electronic device determines, based on the environmental temperature and the temperature of the battery, that the electronic device is in the low-temperature environment.

For example, in this embodiment of this application, a delay in the low-temperature detection performed based on the temperature of the battery is considered. The environmental temperature of the electronic device is usually lower than the temperature of the battery cell. Whether the electronic device is in the low-temperature environment can be sensitively detected based on the environmental temperature of the electronic device. Therefore, in this embodiment of this application, whether the electronic device is in the low-temperature environment is detected based on the environmental temperature and the temperature of the battery, to avoid the delay in the low-temperature detection performed based on only the temperature of the battery, improve accuracy of the electronic device low-temperature detection, and avoid impact of battery performance deterioration on using the electronic device in the low-temperature environment.

For example, when the electronic device determines whether the electronic device is in the low-temperature environment based on the environmental temperature and the temperature of the battery, two temperatures may be compared with the preset temperatures at the same time or in sequence. The preset temperatures compared with the two temperatures may be the same or may be different. Alternatively, a low-temperature mapping table may be searched for based on different value combinations of the environmental temperature and the temperature of the battery, to determine whether the electronic device is in the low-temperature environment. The low-temperature mapping table indicates temperature states of the electronic device under the different temperature value combinations. The temperature states of the electronic device may include a high-temperature environment, a normal-temperature environment, and a low-temperature environment.

S203: The electronic device implements the low-temperature protection in response to the determination of being in the low-temperature environment.

For example, when the electronic device detects that the electronic device is in the low-temperature environment, the electronic device low-temperature protection is immediately performed, and a low-temperature protection measure is performed. This avoids a case in which the battery operates at a low temperature and the electronic device cannot normally respond to an instruction of a user, and therefore avoids adverse impact on user experience of using the electronic device.

Optionally, the low-temperature protection measure performed on the electronic device may include:

adjusting an operating voltage of at least one component of the electronic device;

adjusting an operating current of at least one component of the electronic device;

disabling at least one operating function of the electronic device; and/or disabling at least one application program running on the electronic device.

Specifically, when the low-temperature protection is performed on the electronic device, the operating voltage of the at least one component of the electronic device may be adjusted.

When a temperature of the electronic device is comparatively low, the operating voltage of the component of the electronic device may be reduced, and power consumption of the electronic device may be reduced. This prevents the electronic device from being powered off in the low-temperature environment, and therefore avoids adverse impact on the use of the electronic device. For example, with reference to a manner of adjusting the operating voltage, the operating current of the at least one component of the electronic device may be further adjusted. Optionally, the at least one operating function of the electronic device may be further disabled. For example, when the electronic device is in the low-temperature environment, one or more functions are selected to be disabled based on different heat generating capabilities or power consumption of the operating functions of the electronic device, to prevent the electronic device from being powered off in the low-temperature environment. For example, when the electronic device is a mobile phone, a photographing function and a video function of a camera, a photo-flash light function when the camera is photographing, a flashlight function, or the like may be selected to be disabled. Optionally, the at least one application program running on the electronic device may be further disabled. For example, when there are a large quantity of running application programs, an application program that is currently not used by the user and that is running in a background may be selected to be disabled, to reduce the power consumption.

Optionally, when the low-temperature protection is performed, the foregoing plurality of temperature adjustment manners may be used in combination.

The electronic device low-temperature protection method provided in this application includes that the electronic device obtains the environmental temperature and the temperature of the battery of the electronic device; the electronic device determines, based on the environmental temperature and the temperature of the battery, that the electronic device is in the low-temperature environment; and the electronic device implements the low-temperature protection in response to the determination of being in the low-temperature environment. In this embodiment of this application, the delay in a conventional electronic device temperature protection method in which the low-temperature detection is performed based on the temperature of the battery is considered. The environmental temperature of the electronic device is usually lower than the temperature of the battery cell. Whether the electronic device is in the low-temperature environment can be sensitively detected based on the environmental temperature of the electronic device. Therefore, compared with the conventional electronic device temperature protection method in which the electronic device temperature protection is performed based on only the temperature of the battery, this embodiment of this application considers both the environmental temperature and the temperature of the battery. Whether the electronic device is in the low-temperature environment is detected based on the environmental temperature and the temperature of the battery, to avoid the delay in the low-temperature environment detection performed based on only the temperature of the battery, improve the accuracy of the electronic device low-temperature environment detection, and avoid the impact of battery performance deterioration on use of the electronic device in the low-temperature environment by the user.

For example, based on the embodiment shown in FIG. 2, in the electronic device low-temperature protection method provided in this embodiment of this application, to improve efficiency of detecting the low-temperature environment of the electronic device, whether the environmental temperature or the temperature of the battery is lower than a preset temperature may be first detected. The preset temperature is a temperature higher than the lowest operating temperature of the battery. When the environmental temperature or the temperature of the battery is detected to be not lower than the preset temperature, further temperature detection does not need to be performed. When the environmental temperature or the temperature of the battery is detected to be indeed lower than the preset temperature, more temperature comparison needs to be further performed to determine whether the electronic device is in the low-temperature environment. The environmental temperature and the temperature of the battery may respectively correspond to different preset temperatures.

For example, when the environmental temperature and the temperature of the battery correspond to a same preset temperature, when the temperature of the battery is first compared with a corresponding preset temperature, reliability of the electronic device low-temperature environment detection is comparatively high. When the environmental temperature is first compared with a corresponding preset temperature, sensitivity of the electronic device low-temperature environment detection is comparatively high. This is because the temperature of the battery of a same electronic device is usually higher than the environmental temperature, and the environmental temperature becomes close to the preset temperature than the temperature of the battery earlier, and the next step of the electronic device low-temperature environment detection is triggered earlier. The electronic device low-temperature environment detection includes two steps, to improve efficiency of the electronic device low-temperature environment detection and perform the electronic device low-temperature protection in a more timely manner.

The following describes in detail several possible low-temperature environment detection manners for detecting, based on the environmental temperature and the temperature of the battery, whether the electronic device is in the low-temperature environment.

A first possible low-temperature environment detection manner is:

when the environmental temperature is lower than a first preset temperature, the electronic device determines, based on that the temperature of the battery is lower than a second preset temperature, that the electronic device is in the low-temperature environment.

For example, a process in which the electronic device determines, based on the environmental temperature and the temperature of the battery successively, that the electronic device is in the low-temperature environment includes:

determining whether the environmental temperature is lower than the first preset temperature;

in response to that the determined environmental temperature is lower than the first preset temperature, determining whether the temperature of the battery is lower than the second preset temperature; and in response to that the temperature of the battery is lower than the second preset temperature, determining, by the electronic device, that the electronic device is in the low-temperature environment.

For example, when detecting that the environmental temperature is lower than the first preset temperature, the electronic device considers that the electronic device may be in the low-temperature environment. In this case, whether the electronic device is really in the low-temperature environment is further determined based on whether the temperature of the battery is lower than the second preset temperature. When the temperature of the battery is lower than the second preset temperature, the electronic device determines that the electronic device is in the low-temperature environment; or when the temperature of the battery is not lower than the second preset temperature, the electronic device determines that the electronic device is not in the low-temperature environment. Optionally, values of the first preset temperature and the second preset temperature may be the same, or may be different. For example, in this implementation, considering that the temperature of the battery is usually higher than the environmental temperature, the first preset temperature is lower than the second preset temperature.

A second possible low-temperature environment detection manner is:

when the temperature of the battery is lower than a first preset temperature, the electronic device determines, based on that the environmental temperature is lower than a second preset temperature, that the electronic device is in the low-temperature environment.

For example, a process in which the electronic device determines, based on the environmental temperature and the temperature of the battery successively, that the electronic device is in the low-temperature environment specifically includes:

determining whether the temperature of the battery is lower than the first preset temperature;

in response to that the determined temperature of the battery is lower than the first preset temperature, determining whether the environmental temperature is lower than the second preset temperature; and in response to that the environmental temperature is lower than the second preset temperature, determining, by the electronic device, that the electronic device is in the low-temperature environment.

Similar to the first possible low-temperature environment detection manner, when detecting that the temperature of the battery is lower than the first preset temperature, the electronic device considers that the electronic device may be in the low-temperature environment. In this case, whether the electronic device is really in the low-temperature environment is further determined based on whether the environmental temperature is lower than the second preset temperature. When the environmental temperature is lower than the second preset temperature, the electronic device determines that the electronic device is in the low-temperature environment; or when the environmental temperature is not lower than the second preset temperature, the electronic device determines that the electronic device is not in the low-temperature environment. Optionally, values of the first preset temperature and the second preset temperature may be the same, or may be different. For example, in this implementation, considering that the temperature of the battery is usually higher than the environmental temperature, the second preset temperature is lower than the first preset temperature.

A third possible low-temperature environment detection manner is:

when the environmental temperature is lower than a first preset temperature, the electronic device determines, based on that the temperature of the battery is lower than a second preset temperature and/or the environmental temperature is lower than a third preset temperature, that the electronic device is in the low-temperature environment.

For example, a process in which the electronic device determines that the electronic device is in the low-temperature environment in this implementation specifically includes:

determining whether the environmental temperature is lower than the first preset temperature;

in response to that the determined environmental temperature is lower than the first preset temperature, determining whether the temperature of the battery is lower than the second preset temperature and/or whether the environmental temperature is lower than the third preset temperature; and in response to that the temperature of the battery is lower than the second preset temperature and/or the environmental temperature is lower than the third preset temperature, determining, by the electronic device, that the electronic device is in the low-temperature environment.

For example, different from the first possible low-temperature environment detection manner, when the electronic device detects that the environmental temperature is lower than the first preset temperature, whether the electronic device is really in the low-temperature environment is further determined based on two temperatures: the temperature of the battery and the environmental temperature. For example, when at least one answer to whether the temperature of the battery is lower than the second preset temperature or whether the environmental temperature is lower than the third preset temperature is yes, the electronic device may determine that the electronic device is in the low-temperature environment. It may be understood that when the temperature of the battery is not lower than the second preset temperature and the environmental temperature is not lower than the third preset temperature, the electronic device determines that the electronic device is not in the low-temperature environment. For example, the third preset temperature is lower than the first preset temperature. For example, in this implementation, considering that the temperature of the battery is usually higher than the environmental temperature, the third preset temperature is lower than the second preset temperature.

Whether the electronic device is in the low-temperature environment is detected for a second time based on both the environmental temperature and the temperature of the battery, to improve reliability of the electronic device low-temperature environment detection.

A fourth possible low-temperature environment detection manner is:

when the temperature of the battery is lower than a first preset temperature, the electronic device determines, based on that the environmental temperature is lower than a second preset temperature and/or the temperature of the battery is lower than a third preset temperature, that the electronic device is in the low-temperature environment.

For example, a process in which the electronic device determines that the electronic device is in the low-temperature environment in this implementation includes:

determining whether the temperature of the battery is lower than the first preset temperature;

in response to that the determined temperature of the battery is lower than the first preset temperature, determining whether the environmental temperature is lower than the second preset temperature and/or whether the temperature of the battery is lower than the third preset temperature; and in response to that the environmental temperature is lower than the second preset temperature and/or the temperature of the battery is lower than the third preset temperature, determining, by the electronic device, that the electronic device is in the low-temperature environment.

For example, different from the second possible low-temperature environment detection manner, when the electronic device detects that the temperature of the battery is lower than the first preset temperature, whether the electronic device is really in the low-temperature environment is further determined based on two temperatures: the temperature of the battery and the environmental temperature. For example, when at least one answer to whether the environmental temperature is lower than the second preset temperature or whether the temperature of the battery is lower than the third preset temperature is yes, the electronic device may determine that the electronic device is in the low-temperature environment. It may be understood that when the temperature of the battery is not lower than the third preset temperature and the environmental temperature is not lower than the second preset temperature, the electronic device determines that the electronic device is not in the low-temperature environment. For example, the third preset temperature is lower than the first preset temperature. For example, in this implementation, considering that the temperature of the battery is usually higher than the environmental temperature, the second preset temperature is lower than the third preset temperature.

Whether the electronic device is in the low-temperature environment is detected for a second time based on both the environmental temperature and the temperature of the battery, to improve the reliability of the electronic device low-temperature environment detection.

It may be understood that values of the first preset temperature in the foregoing low-temperature environment detection manners may be the same or may be different. Likewise, values of the second preset temperature in the foregoing low-temperature environment detection manners may be the same or may be different. Values of the third preset temperature in the foregoing low-temperature environment detection manners may be the same or may be different.

It may be understood that a larger value of the first preset temperature in the foregoing low-temperature environment detection manners indicates higher sensitivity of the low-temperature environment detection manner, and a smaller value of the first preset temperature indicates higher reliability of the low-temperature environment detection manner.

An embodiment of this application further provides an electronic device low-temperature protection apparatus, configured to perform the electronic device low-temperature protection method in any implementation of the first aspect. The low-temperature protection apparatus has a same or similar technical means and technical effect. Details are not described again in this application.

Figure 3:
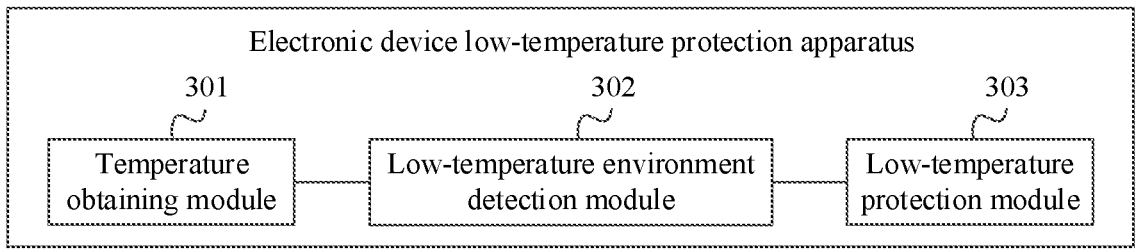
FIG. 3 is a schematic diagram of a structure of an electronic device low-temperature protection apparatus according to an embodiment of this application.

FIG. 3 is a schematic diagram of a structure of an electronic device low-temperature protection apparatus according to an embodiment of this application. The electronic device low-temperature protection apparatus in this embodiment may be the electronic device shown in FIG. 1, or may be a chip of the electronic device. The electronic device low-temperature protection apparatus may be configured to perform actions of the electronic device in the method embodiment. As shown in FIG. 3, the electronic device low-temperature protection apparatus includes a temperature obtaining module 301, a low-temperature environment detection module 302, and a low-temperature protection module 303.

The temperature obtaining module 301 is configured to obtain an environmental temperature and a temperature of a battery of an electronic device.

The low-temperature environment detection module 302 is configured to determine, based on the environmental temperature and the temperature of the battery, that the electronic device is in a low-temperature environment.

The low-temperature protection module 303 is configured to implement low-temperature protection in response to the determination of being in the low-temperature environment.

Optionally, the low-temperature environment detection module 302 is configured to, when the environmental temperature is lower than a first preset temperature, determine, based on that the temperature of the battery is lower than a second preset temperature, that the electronic device is in the low-temperature environment.

Optionally, the low-temperature environment detection module 302 is configured to, when the temperature of the battery is lower than a first preset temperature, determine, based on that the environmental temperature is lower than a second preset temperature, that the electronic device is in the low-temperature environment.

Optionally, the low-temperature environment detection module 302 is configured to, when the environmental temperature is lower than a first preset temperature, determines, based on that the temperature of the battery is lower than a second preset temperature and/or the environmental temperature is lower than a third preset temperature, that the electronic device is in the low-temperature environment.

Optionally, the low-temperature environment detection module 302 is configured to, when the temperature of the battery is lower than a first preset temperature, determines, based on that the environmental temperature is lower than a second preset temperature and/or the temperature of the battery is lower than a third preset temperature, that the electronic device is in the low-temperature environment.

Optionally, the temperature obtaining module 301 is further configured to determine the environmental temperature based on a system parameter of the electronic device and a preset mapping relationship. The preset mapping relationship indicates an environmental temperature corresponding to the system parameter.

Optionally, the system parameter of the electronic device includes at least one of the following: power of a display of the electronic device, luminance of the display of the electronic device, power consumption of the electronic device, and/or a temperature collected by a temperature sensor of the battery.

Optionally, the temperature obtaining module 301 is further configured to obtain a temperature collected by a temperature sensor of the electronic device.

Optionally, the low-temperature protection module 303 is specifically configured to perform the electronic device low-temperature protection in at least one of the following manners:

adjusting an operating voltage of at least one component of the electronic device;

adjusting an operating current of at least one component of the electronic device;

disabling at least one operating function of the electronic device; and/or disabling at least one application program running on the electronic device.

For example, when the electronic device is a mobile phone, the electronic device low-temperature protection apparatus may be a central processing unit CPU inside the mobile phone. The CPU is configured to obtain the environmental temperature of the electronic device based on a system parameter of the mobile phone, for example, a current running state of the mobile phone, and obtain the temperature of the battery based on a temperature sensor inside the mobile phone. When the CPU determines, based on the environmental temperature and the temperature of the battery, that the mobile phone is in a low-temperature environment, the CPU disables operating components such as photo-flash light, a camera, and a flashlight, or rejects an instruction entered by a user to enable such a component/function with comparatively high power consumption.

An embodiment of this application further provides an electronic device low-temperature protection device, configured to perform the electronic device low-temperature protection method in any one of the foregoing embodiments. The low-temperature protection device has a same or similar technical means and technical effect. Details are not described again in this application.

An embodiment of this application further provides an electronic device, configured to perform the electronic device low-temperature protection method in any one of the foregoing embodiments. The electronic device has a same or similar technical means and technical effect. Details are not described again in this application.

Figure 4:
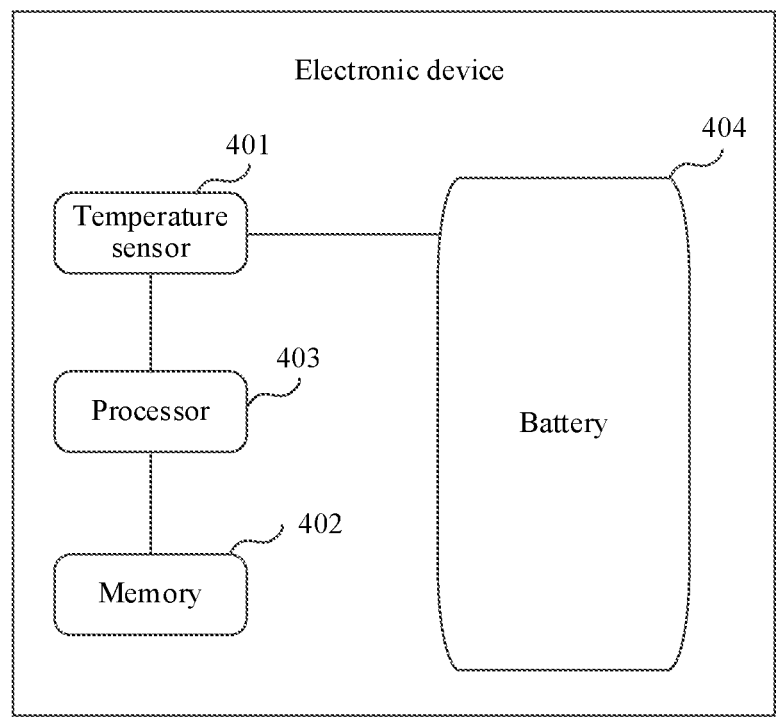
FIG. 4 is a schematic diagram of a structure of an electronic device according to an embodiment of this application.

FIG. 4 is a schematic diagram of a structure of an electronic device according to an embodiment of this application. As shown in FIG. 4, the electronic device includes a temperature sensor 401, a memory 402, a processor 403, and a battery 404. The temperature sensor 401 is configured to monitor a temperature of the battery 404, and send the battery temperature of the battery 404 to the processor 403. The memory 402 may include a high-speed random memory, or may include a nonvolatile memory, for example, at least one magnetic disk storage. The memory 402 may store various programs, to complete various processing functions and implement method steps in this embodiment. The processor 403 is configured to execute the program stored in the memory 402.

The processor 403 is configured to obtain an environmental temperature and a temperature of the battery of the electronic device.

The processor 403 is further configured to determine, based on the environmental temperature and the temperature of the battery, that the electronic device is in a low-temperature environment.

The processor 403 is further configured to implement low-temperature protection in response to the determined being in the low-temperature environment.

Optionally, the processor 403 is specifically configured to: when the environmental temperature is lower than a first preset temperature, determine, based on that the temperature of the battery is lower than a second preset temperature, that the electronic device is in the low-temperature environment.

Optionally, the processor 403 is specifically configured to: when the temperature of the battery is lower than a first preset temperature, determine, based on that the environmental temperature is lower than a second preset temperature, that the electronic device is in the low-temperature environment.

Optionally, the processor 403 is specifically configured to when the environmental temperature is lower than a first preset temperature, determines, based on that the temperature of the battery is lower than a second preset temperature and/or the environmental temperature is lower than a third preset temperature, that the electronic device is in the low-temperature environment.

Optionally, the processor 403 is specifically configured to: when the temperature of the battery is lower than a first preset temperature, determines, based on that the environmental temperature is lower than a second preset temperature and/or the temperature of the battery is lower than a third preset temperature, that the electronic device is in the low-temperature environment.

Optionally, the processor 403 is further configured to determine the environmental temperature of the electronic device based on a system parameter of the electronic device and a preset mapping relationship. The preset mapping relationship indicates an environmental temperature corresponding to the system parameter.

Optionally, the system parameter of the electronic device includes at least one of the following: power of a display of the electronic device, luminance of the display of the electronic device, power consumption of the electronic device, and/or a temperature collected by a temperature sensor of the battery.

Optionally, the processor 503 is further configured to obtain a temperature collected by the temperature sensor 501, and use the temperature as the temperature of the battery.

Optionally, the processor 503 is further configured to perform the electronic device low-temperature protection in at least one of the following manners:

adjusting an operating voltage of at least one component of the electronic device;

adjusting an operating current of at least one component of the electronic device;

disabling at least one operating function of the electronic device; and/or disabling at least one application program running on the electronic device.

Figure 5:
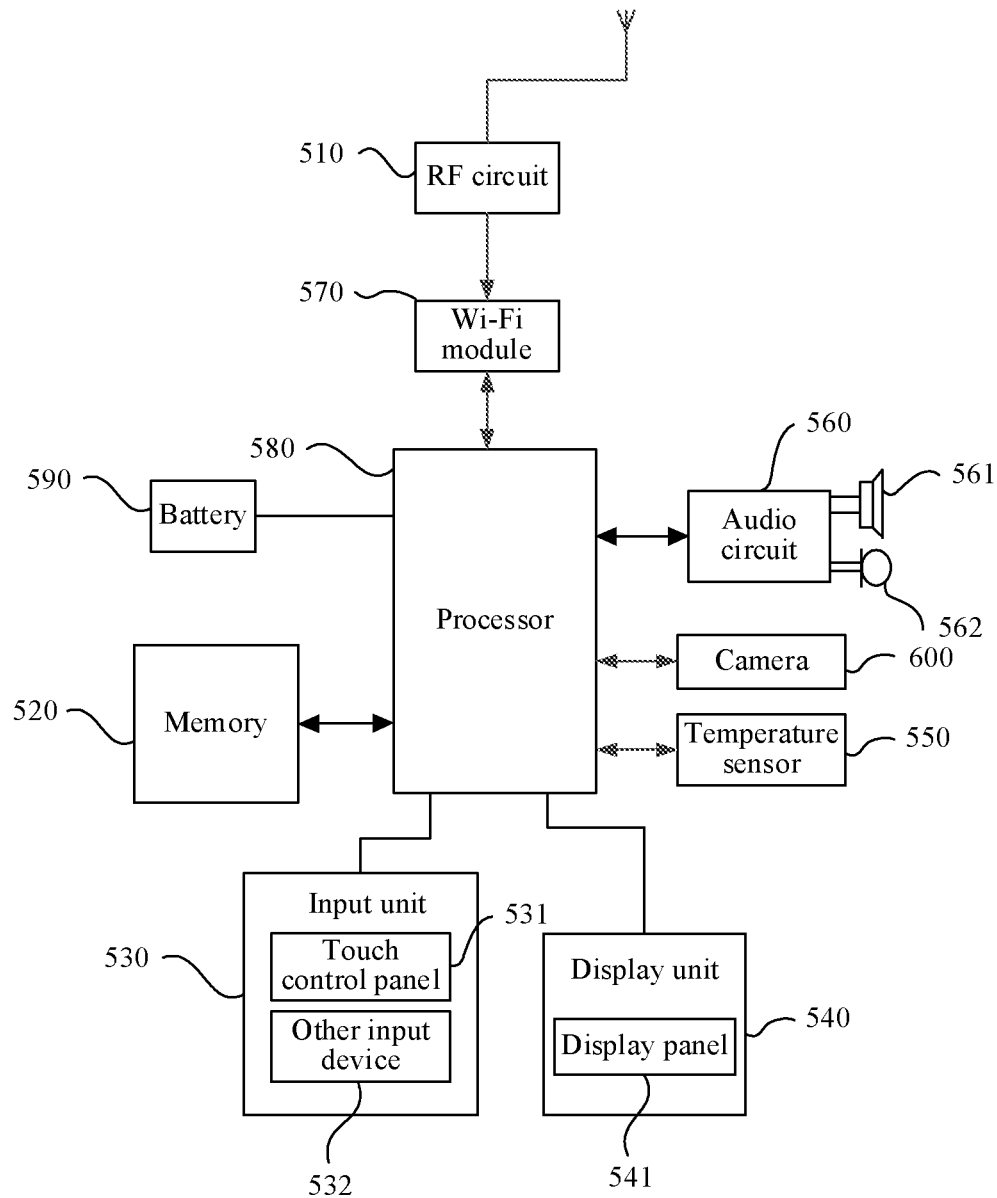
FIG. 5 is a structural block diagram of an electronic device when the electronic device is a mobile phone according to an embodiment of this application.

As described in the foregoing embodiment, the electronic device in this embodiment of this application may be a wireless terminal such as a mobile phone or a tablet computer. Therefore, that the electronic device is the mobile phone is used as an example. FIG. 5 is a structural block diagram of an electronic device when the electronic device is a mobile phone according to an embodiment of this application. Referring to FIG. 5, the mobile phone may include components such as a radio frequency (RF) circuit 510, a memory 520, an input unit 530, a display unit 540, a temperature sensor 550, an audio frequency circuit 560, a wireless fidelity (Wi-Fi) module 570, a processor 580, and a battery 590. A person skilled in the art may understand that a structure of the mobile phone shown in FIG. 5 does not constitute a limitation on the mobile phone, and the mobile phone may include more or fewer components than those shown in the figure, combine some components, or have different component arrangements.

The following describes each component of the mobile phone in detail with reference to FIG. 5.

The RF circuit 510 may be configured to receive/send a signal in an information receiving/sending process or a call process. In particular, after receiving downlink information from a base station, the RF circuit 510 sends the downlink information to the processor 580 for processing. In addition, the RF circuit 510 sends uplink data to the base station. The RF circuit 510 usually includes but is not limited to an antenna, at least one amplifier, a transceiver, a coupler, a low noise amplifier (LNA), a duplexer, and the like. In addition, the RF circuit 510 may further communicate with a network and another device by using wireless communication. The wireless communication may use any communications standard or protocol, including but not limited to global system for mobile communications (GSM), a general packet radio service (GPRS), code division multiple access (CDMA), wideband code division multiple access (WCDMA), long term evolution (LTE), an e-mail message, a short message service (SMS), and the like.

The memory 520 may be configured to store a software program and a module. The processor 580 runs the software program and the module stored in the memory 520 to perform various function applications of the mobile phone and data processing. The memory 520 may mainly include a program storage area and a data storage area. The program storage area may store an operating system, an application program required by at least one function (such as a sound playing function or an image playing function), and the like. The data storage area may store data (such as audio data or a phone book) created based on use of the mobile phone, and the like. In addition, the memory 520 may include a high-speed random access memory, and may further include a nonvolatile memory, for example, at least one magnetic disk storage device, a flash memory device, or another volatile solid-state storage device.

The input unit 530 may be configured to receive entered number or character information, and generate key signal input related to a user setting and function control of the mobile phone. Specifically, the input unit 530 may include a touch control panel 531 and another input device 532. The touch control panel 531, also referred to as a touchscreen, may collect a touch operation (for example, an operation performed by a user on the touch control panel 531 or near the touch control panel 531 by using any proper object or accessory such as a finger or a tablet pen) performed by a user on or near the touch control panel 531, and drive a corresponding connection apparatus based on a preset program. Optionally, the touch control panel 531 may include two parts: a touch detection apparatus and a touch controller. The touch detection apparatus detects a touch position of the user, detects a signal brought by the touch operation, and transmits the signal to the touch controller. The touch controller receives touch information from the touch detection apparatus, and converts the touch information into coordinates of a touch point. Then the touch controller sends the coordinates of the touch point to the processor 580, and can receive and execute a command sent by the processor 580. In addition, the touch control panel 531 may be implemented in a plurality of types, such as a resistive type, a capacitive type, an infrared type, and a surface acoustic wave type. In addition to the touch control panel 531, the input unit 530 may further include the other input device 532. Specifically, the other input device 532 may include but is not limited to one or more of a physical keyboard, a function key (for example, a volume control press key or a power on/off press key), a trackball, a mouse, a joystick, and the like.

The display unit 540 may be configured to display information entered by the user or information provided for the user, and various menus of the mobile phone. The display unit 540 may include a display panel 541. Optionally, the display panel 541 may be configured in a form of a liquid crystal display (LCD), an organic light-emitting diode (Organic Light-Emitting Diode, OLED), and the like. Further, the touch control panel 531 may cover the display panel 541. When detecting the touch operation on or near the touch control panel 531, the touch control panel 531 transmits the touch operation to the processor 580 to determine a type of a touch event. Then the processor 580 provides corresponding visual output on the display panel 541 based on the type of the touch event. In FIG. 5, the touch control panel 531 and the display panel 541 are used as two independent parts to implement input and input functions of the mobile phone. However, in some embodiments, the touch control panel 531 and the display panel 541 may be integrated to implement the input and output functions of the mobile phone.

The mobile phone may further include the temperature sensor 550. The temperature sensor 550 may be disposed on a protection board of the battery 590, and is configured to detect a temperature of the battery 590. The mobile phone may further include at least one other sensor, for example, an optical sensor, a motion sensor, and another sensor. Specifically, the optical sensor may include an ambient light sensor and a proximity sensor. The ambient light sensor may adjust brightness of the display panel 541 based on the brightness of ambient light. The optical sensor may disable the display panel 541 and/or backlight when the mobile phone moves to an ear. As one type of the motion sensor, an accelerometer sensor may detect acceleration values in various directions (usually on three axes). The accelerometer sensor may detect a value and a direction of gravity when the accelerometer sensor is stationary, and may be used by an application for recognizing a mobile phone posture (for example, switching between a landscape screen and a vertical screen, a related game, and magnetometer posture calibration), functions related to vibration recognition (such as a pedometer and a knock), and the like. Other sensors such as a gyroscope, a barometer, a hygrometer, a thermometer, and an infrared sensor may be further configured in the mobile phone. Details are not described herein.

The audio circuit 560, a speaker 561, and a microphone 562 may provide an audio interface between the user and the mobile phone. The audio circuit 560 may convert received audio data into an electrical signal and then transmit the electrical signal to the speaker 561, and the speaker 561 converts the electrical signal into a sound signal for output. In addition, the microphone 562 converts a collected sound signal into an electrical signal. The audio circuit 560 receives the electrical signal, converts the electrical signal into audio data, and then outputs the audio data to the processor 580 for processing, to send, through the RF circuit 510, the audio data to, for example, another mobile phone, or outputs the audio data to the memory 520 for further processing.

Wi-Fi is a short-distance wireless transmission technology. With the Wi-Fi module 570, the mobile phone may help the user send and receive an email message, browse a web page, gain access to streaming media, and the like. The Wi-Fi module 570 provides wireless access to a broadband internet for the user. Although FIG. 5 shows the Wi-Fi module 570, it may be understood that the Wi-Fi module 570 is not a mandatory component of the mobile phone, and may be omitted based on a requirement without changing the essence of this application.

The processor 580 is a control center of the mobile phone. The processor 580 connects each part of the entire mobile phone through various interfaces and lines. In addition, the processor 580 runs or executes the software program and/or the module that are/is stored in the memory 520 and invokes data stored in the memory 520 to perform various functions of the mobile phone and data processing, so as to perform overall monitoring on the mobile phone. Optionally, the processor 580 may include one or more processing units. An application processor and a modem processor may be integrated in the processor 580. The application processor mainly processes an operating system, a user interface, an application program, and the like. The modem processor mainly processes wireless communication. It may be understood that the modem processor may alternatively not be integrated into the processor 580.

The mobile phone further includes the battery 590 that supplies power to each part. The battery 590 may be a battery string. The battery 590 may be functionally connected to the processor 580 via a power management system, to implement functions such as charging management, discharging management, and power consumption management by using the power management system.

The mobile phone may further include a camera 600. The camera may be a front-facing camera, or may be a rear-facing camera. Although not shown, the mobile phone may further include a Bluetooth module, a GPS module, and the like. Details are not described herein.

In this embodiment of this application, based on a same application concept, a problem-resolving principle of the electronic device provided in this embodiment of this application is similar to that of the electronic device low-temperature protection method in the method embodiment of this application. The processor 580 included in the mobile phone may be configured to perform an implementation solution of the electronic device low-temperature protection method described above in this application. For details, refer to a corresponding description in any one of the foregoing embodiments. For an implementation principle and a technical effect of the processor 580, refer to an implementation principle and a technical effect of the electronic device low-temperature protection method in the foregoing method implementation. Details are not described herein again.

The sequence numbers of the foregoing embodiments of this application are merely for illustrative purposes, and are not intended to indicate priorities of the embodiments.

This application further provides a computer storage medium. The storage medium includes a computer program. The computer program is used to implement the electronic device low-temperature protection method in any one of the foregoing embodiments.

This application further provides a computer program product. The computer program product includes computer program code. When the computer program code is run on a computer, the computer is enabled to perform the electronic device low-temperature protection method in any one of the foregoing embodiments.

This application further provides a chip, including a memory and a processor. The memory is configured to store a computer program. The processor is configured to invoke the computer program from the memory and run the computer program, so that an electronic device in which the chip is installed performs the electronic device low-temperature protection method in any one of the foregoing embodiments.

In this application, "at least one" means one or more, and "a plurality of" means two or more. The term "and/or" describes an association relationship between associated objects and may indicate three relationships. For example, A and/or B may indicate the following cases: Only A exists, both A and B exist, and only B exists, where A and B may be singular or plural. The character "/" generally indicates an "or" relationship between the associated objects. "At least one item (piece) of the following" or a similar expression thereof means any combination of these items, including any combination of singular items (pieces) or plural items (pieces). For example, at least one (one piece) of a, b, or c may indicate: a, b, c, a-b, a-c, b-c, or a-b-c, where a, b, and c may be singular or plural.

In the embodiments of this application, the processor may be a general purpose processor, a digital signal processor, an application-specific integrated circuit, a field programmable gate array or another programmable logic device, a discrete gate or transistor logic device, or a discrete hardware component, and may implement or perform the methods, steps, and logical block diagrams disclosed in the embodiments of this application. The general purpose processor may be a microprocessor or any conventional processor or the like. The steps of the method disclosed with reference to the embodiments of this application may be directly performed by a hardware processor, or may be performed by using a combination of hardware in the processor and a software module.

The memory in the embodiments of this application may be a nonvolatile memory, such as a hard disk drive (HDD) or a solid-state drive (solid-state drive, SSD), or may be a nonvolatile memory (non-transitory memory), for example, a random-access memory (RAM) memory. The memory is any other medium that can be used to carry or store expected program code in a form of an instruction or a data structure and that can be accessed by a computer, but is not limited thereto.

In the several embodiments provided in this application, it should be understood that the disclosed apparatus and method may be implemented in other manners. For example, the described apparatus embodiment is merely an example. For example, division into the units is merely logical function division and may be other division in an actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of the embodiments.

In addition, functional units in the embodiments of this application may be integrated into one processing unit, or each of the units may exist alone physically, or two or more units are integrated into one unit. The integrated unit may be implemented in a form of hardware, or may be implemented in a form of hardware in addition to a software functional unit.

Sequence numbers of the foregoing processes do not mean execution sequences in various embodiments of this application. The execution sequences of the processes should be determined based on functions and internal logic of the processes, and should not be construed as any limitation on the implementation processes of the embodiments of this application.

All or some of the foregoing embodiments may be implemented by using software, hardware, firmware, or any combination thereof. When software is used to implement the embodiments, all or some of the embodiments may be implemented in a form of a computer program product. The computer program product includes one or more computer instructions. When the computer program instructions are loaded and executed on the computer, the procedure or functions according to the embodiments of this application are all or partially generated. The computer may be a general-purpose computer, a dedicated computer, a computer network, or other programmable apparatuses. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid-state drive (SSD)), or the like.

What is claimed is:

1. An electronic device low-temperature protection method, comprising:
    obtaining, by an electronic device, an environmental temperature and a temperature of a battery of the electronic device;
    when the environmental temperature is lower than a first preset temperature, determining, by the electronic device based on that the temperature of the battery is lower than a second preset temperature and the environmental temperature is lower than a third preset temperature, that the electronic device is in a low-temperature environment; and
    implementing, by the electronic device, a low-temperature protection in response to determining that the electronic device is in the low-temperature environment.

2. The method of claim 1, wherein the obtaining, by an electronic device, an environmental temperature comprises:
    determining, by the electronic device, the environmental temperature based on a system parameter of the electronic device and a preset mapping relationship; wherein
    the preset mapping relationship indicates an environmental temperature corresponding to the system parameter.

3. The method of claim 1, wherein the system parameter of the electronic device comprises at least one of the following:
    power consumption of a display of the electronic device;
    luminance of the display of the electronic device;
    power consumption of the electronic device; or
    a temperature collected by a temperature sensor of the battery.

4. The method of claim 1, wherein the electronic device comprises a notebook computer, a mobile phone, a smart band, or an electric vehicle.

5. The method of claim 1, wherein the environmental temperature is a current temperature information at a geographical position of the electronic device queried through the network.

6. The method of claim 1, wherein the battery comprises lithium battery.

7. The method according to claim 1, wherein the low-temperature protection comprises at least one of the following manners:
    adjusting an operating voltage of at least one component of the electronic device;
    adjusting an operating current of at least one component of the electronic device;
    disabling at least one operating function of the electronic device; or disabling at least one application program running on the electronic device.

8. An electronic device, comprising a processor and a computer-readable medium having processor-executable instructions stored thereon, wherein the processor-executable instructions, when executed by the processor, facilitate: obtaining an environmental temperature and a temperature of a battery of the electronic device; when the environmental temperature is lower than a first preset temperature, determining that the electronic device is in a low-temperature environment based on that the temperature of the battery is lower than a second preset temperature and the environmental temperature is lower than a third preset temperature; and implementing a low-temperature protection in response to determining that the electronic device is in the low-temperature environment.

9. The electronic device of claim 8, wherein the obtaining an environmental temperature comprises:
determining the environmental temperature based on a system parameter of the electronic device and a preset mapping relationship; wherein
the preset mapping relationship indicates an environmental temperature corresponding to the system parameter.

10. The electronic device of claim 8, wherein the system parameter of the electronic device comprises at least one of the following:
power consumption of a display of the electronic device;
luminance of the display of the electronic device;
power consumption of the electronic device; or
a temperature collected by a temperature sensor of the battery.

11. The electronic device of claim 8, wherein the electronic device comprises a notebook computer, a mobile phone, a smart band, or an electric vehicle.

12. The electronic device of claim 8, wherein the environmental temperature is a current temperature information at a geographical position of the electronic device queried through the network.

13. The electronic device of claim 8, wherein the battery comprises lithium battery.

14. The electronic device of claim 8, wherein the low-temperature protection comprises at least one of the following manners:
adjusting an operating voltage of at least one component of the electronic device;
adjusting an operating current of at least one component of the electronic device;
disabling at least one operating function of the electronic device; or
disabling at least one application program running on the electronic device.

15. A non-transitory computer-readable medium having processor-executable instructions stored thereon, wherein the processor-executable instructions, when executed, facilitate:
obtaining an environmental temperature and a temperature of a battery of the electronic device;
when the environmental temperature is lower than a first preset temperature, determining that the electronic device is in a low-temperature environment based on that the temperature of the battery is lower than a second preset temperature and the environmental temperature is lower than a third preset temperature; and
implementing a low-temperature protection in response to determining that the electronic device is in the low-temperature environment.

16. The non-transitory computer-readable medium of claim 15, wherein the obtaining an environmental temperature comprises:
determining the environmental temperature based on a system parameter of the electronic device and a preset mapping relationship; wherein
the preset mapping relationship indicates an environmental temperature corresponding to the system parameter.

17. The non-transitory computer-readable medium of claim 15, wherein the system parameter of the electronic device comprises at least one of the following:
power consumption of a display of the electronic device;
luminance of the display of the electronic device;
power consumption of the electronic device; or
a temperature collected by a temperature sensor of the battery.

18. The non-transitory computer-readable medium of claim 15, wherein the environmental temperature is a current temperature information at a geographical position of the electronic device queried through the network.

19. The non-transitory computer-readable medium of claim 15, wherein the battery comprises lithium battery.

20. The non-transitory computer-readable medium of claim 15, wherein the low-temperature protection comprises at least one of the following manners:
adjusting an operating voltage of at least one component of the electronic device;
adjusting an operating current of at least one component of the electronic device;
disabling at least one operating function of the electronic device; or
disabling at least one application program running on the electronic device.

* * * * *